United States Patent
Quiroz-Hernandez

(10) Patent No.: US 8,998,580 B2
(45) Date of Patent: Apr. 7, 2015

(54) METHOD FOR BALANCING A PROPULSIVE SYSTEM HAVING NON-HULL CONTRA-ROTATING PROPELLERS

(75) Inventor: Esteban Quiroz-Hernandez, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 546 days.

(21) Appl. No.: 13/527,749

(22) Filed: Jun. 20, 2012

(65) Prior Publication Data

US 2012/0328433 A1 Dec. 27, 2012

(30) Foreign Application Priority Data

Jun. 22, 2011 (FR) ..................... 11 55507

(51) Int. Cl.
| | | |
|---|---|---|
| *B64C 11/02* | (2006.01) | |
| *B64C 11/00* | (2006.01) | |
| *F01D 5/02* | (2006.01) | |
| *F16F 15/36* | (2006.01) | |
| *F02K 3/02* | (2006.01) | |
| *B64D 27/00* | (2006.01) | |
| *B64D 27/02* | (2006.01) | |

(52) U.S. Cl.
CPC ......... *B64C 11/008* (2013.01); *B64D 2027/005* (2013.01); *B64D 2027/026* (2013.01); *F01D 5/027* (2013.01); *F16F 15/36* (2013.01); *F05D 2250/41* (2013.01); *F02K 3/025* (2013.01); *F05D 2260/57* (2013.01); *F05D 2250/44* (2013.01); *Y02T 50/66* (2013.01); *Y02T 50/673* (2013.01)

(58) Field of Classification Search
CPC ........ B64C 11/008; F01D 5/027; F16F 15/32; F16F 15/36; F02K 3/025
USPC .................... 416/144, 145; 73/455
See application file for complete search history.

(56) References Cited

U.S. PATENT DOCUMENTS 3,830,109 A * 8/1974 Litvinovich et al. ............ 73/455

FOREIGN PATENT DOCUMENTS

WO 2008127362 10/2008

OTHER PUBLICATIONS

French Patent Office, Preliminary Search Report for FR 1155507, Feb. 23, 2012 (2 pgs.).

* cited by examiner

*Primary Examiner* — Richard Edgar
(74) *Attorney, Agent, or Firm* — Wood, Herron & Evans, LLP

(57) ABSTRACT

According to the invention, at least one of the counterweights (40, 40.1, 40.2, 40.3, 40.4) is mobile mounted on a guiding slot (24, 34) coaxial to the hub envelope (22, 32) that surrounds the hub (21, 31) of the corresponding propeller (2, 3), the movement of said mobile counterweight (40, 40.1, 40.2, 40., 40.4) along said guiding slot (24, 34) being controlled on the basis of an estimation of the possible unbalance of said propulsive system (1).

11 Claims, 5 Drawing Sheets

METHOD FOR BALANCING A PROPULSIVE SYSTEM HAVING NON-HULL CONTRA-ROTATING PROPELLERS

The present invention relates to a balancing method for a propulsive system with coaxial non streamlined contra-rotating propellers.

It is known that, in such propulsive system, generally so-called CROR (for "Contra-Rotating Open Rotor"), each propeller comprises a hub concentrically surrounded by a hub envelope, provided itself with an external wall. In such propulsive system type, the centre of gravity of each propeller is adapted to be deviated from the axis of rotation thereof, thereby resulting, upon its rotation, in a radial unbalance phenomenon. Now, such unbalance is able to generate mechanical vibrations being able to be transmitted to a piece of equipment—in particular the nacelle of an aircraft receiving passengers—to which the propulsive system is attached, which can be inconvenient for them.

In order to eliminate (or at least to reduce) such possible radial unbalance, it is already known to fit a set of counterweights, the masses of which are adequately selected, on places provided on the propulsive system, so as to position the centre of gravity of each of the propellers on the axis of rotation and thereby to balance said propulsive system.

However, when the propulsive system is in flight conditions, the propeller blades are submitted to a set of axial aerodynamic forces (thrust and resistance) being able to generate forces and additional moments, thereby unbalancing the propulsive system.

So that the balancing of the propulsive system is adapted to such flight conditions, it is also known to modify the angular position of the counterweights. In such a way, the propulsive system can be balanced at each time. Moreover, it will be noticed that such balancing type enables, with respect to a passive equilibrium, to more easily determine if one propeller is degraded.

An example of such adaptive balancing, for a propulsive system with a single non streamlined propeller, is disclosed in the document WO 2008/127362. In such a document, two unbalanced rings, being coaxial to the hub envelope and adapted to rotate integrally with the corresponding propeller, are each equipped with a set of permanent magnets regularly distributed on their circumference. The angular position of each ring can be adjusted by means of magnetic coils generating a magnetic field being able to react with said permanent magnets. The relative angular position between the unbalanced rings then determines the total equilibrium unbalance.

While the balancing method described in such prior document is convenient for a propulsive system with a single non streamlined propeller, the adaptation thereof to a propulsive system with several coaxial non streamlined contra-rotating propellers presents this disadvantage to increase the mass thereof. Indeed, on the one side, in such type of propulsive system, the hub diameter is high, which needs that the ring diameter and the number of permanent magnets being associated therewith—and thus their masses—are high. On the other side, in such type of propulsive system, the rear propeller must be supported by the front propeller and not by a fixed structure of the propulsive system, thereby implying that no fixed structure is adjacent to said rear propeller and that the magnetic coils cannot thus be arranged the closest to the latter, so that the adaptive balancing described in such prior document cannot be performed on such rear propeller.

Furthermore, it will be noticed that the magnetic coils, being joined to the fixed structure of the propulsive system, constitute additional masses not taking part directly in the balancing of the propulsive system.

The object of the present invention is to remedy such disadvantages.

With this end in view, the balancing method for a propulsive system with at least two coaxial non streamlined contra-rotating propellers, each of said propellers comprising a hub concentrically surrounded by a hub envelope and each of said hub envelopes being provided with an external wall, said balancing method according to which, to eliminate, or at least to reduce a possible unbalance of said propulsive system, counterweights are arranged on places provided on the latter, is remarkable in that at least one of said counterweights is movably mounted on a guiding slot being coaxial to the corresponding hub envelope, the displacement of said mobile counterweight along said guiding slot being controlled as a function of an estimation of the possible unbalance of said propulsive system.

In such a way, thanks to the present invention, the additional mass being specifically dedicated to the balancing of the propulsive system is reduced. Indeed, the mobile counterweights, which can be in a limited number due to their mobility along a guiding slot being coaxial to the axis of the propellers, advantageously replace a plurality of permanent magnets and magnetic coils generating a particularly high additional mass.

Furthermore, it should be noticed that, unlike the magnetic coils, the mobile counterweights take directly part in the balancing, thereby allowing the additional mass to be limited, which only takes part indirectly in said balancing.

Moreover, still thanks to the present invention, the mobile counterweights can be directly arranged on the hub envelop of each propeller, that forms a rotating part. The propeller balancing can thus be performed by only using elements on the rotating parts of the propulsive system and not on a fixed structure adjacent to the propellers, thereby enabling to balance both propellers, in particular the rear propeller.

The guiding slot may comprise a rib provided on the external wall of the corresponding hub envelope so as to make the displacement of the mobile counterweight easier along such rib.

In order to avoid that the mobile counterweight be separated from the guiding slot under the effect of tangential forces, said guiding slot can present side recesses, whereas said mobile counterweight can comprise means for holding the latter inside said side recesses.

According to a particular embodiment of the present invention, said guiding slot can be provided with a rack, and said mobile counterweight can comprise a pinion able to be meshed with said rack so that, thru said rack, the rotation of said pinion causes the displacement of said mobile counterweight along said guiding slot. Thus, thru the pinion being provided on said mobile counterweight, it is possible to control the displacement of the latter along said guiding slot.

In such a case, in order to control the rotation of said pinion, said mobile counterweight can comprise an endless screw supported by a driving shaft and able to be meshed with said pinion so that, thru the endless screw, the rotation of said driving shaft causes the rotation of said pinion.

The endless screw can be driven by an electrical engine. The electrical source can for example be able to tap a part of the electric power generated by the anti-icing system of the corresponding propeller.

The displacement of said mobile counterweight along said guiding slot being controlled according to the present invention as a function of a possible unbalance of said propulsive system, such displacement can be controlled by controlling means being able to receive information on the possible unbalance of said propulsive system, to determine the position of each mobile counterweight so as to eliminate, or at least to reduce said possible unbalance and to transmit to each mobile counterweight the corresponding displacement order.

So that the position of said mobile counterweight can be determined upon the displacement thereof, it can be envisaged, on the one side, that the external wall of said hub envelope is provided of an angular graduation, and, on the other side, that said mobile counterweight includes a reader for said angular graduation.

Preferably, two of said counterweights are movably mounted on a guiding slot being coaxial to the corresponding hub envelope, the respective displacements of said mobile counterweights along said guiding slot being controlled as a function of an estimation of the possible unbalance in said propulsive system. Thus, the relative displacements of said mobile counterweights allow said propulsive system to be precisely balanced.

The present invention also relates to a propulsive system with at least two coaxial non streamlined contra-rotating propellers, each of said propellers comprising a hub concentrically surrounded by a hub envelope and each of said hub envelopes being provided with an external wall, said propulsive system comprising counterweights arranged in places provided on the latter so as to eliminate, or at least to reduce, a possible unbalance of said propulsive system, being remarkable in that at least one of said counterweights is movably mounted on a guiding slot being coaxial to the corresponding hub envelope, the displacement of said mobile counterweight along said guiding slot being controlled as a function of an estimation of the possible unbalance in said propulsive system.

The FIGS. of the accompanying drawing will make well understood how the invention can be implemented. On such FIGS., identical references designate similar technical elements.

Figure 1:
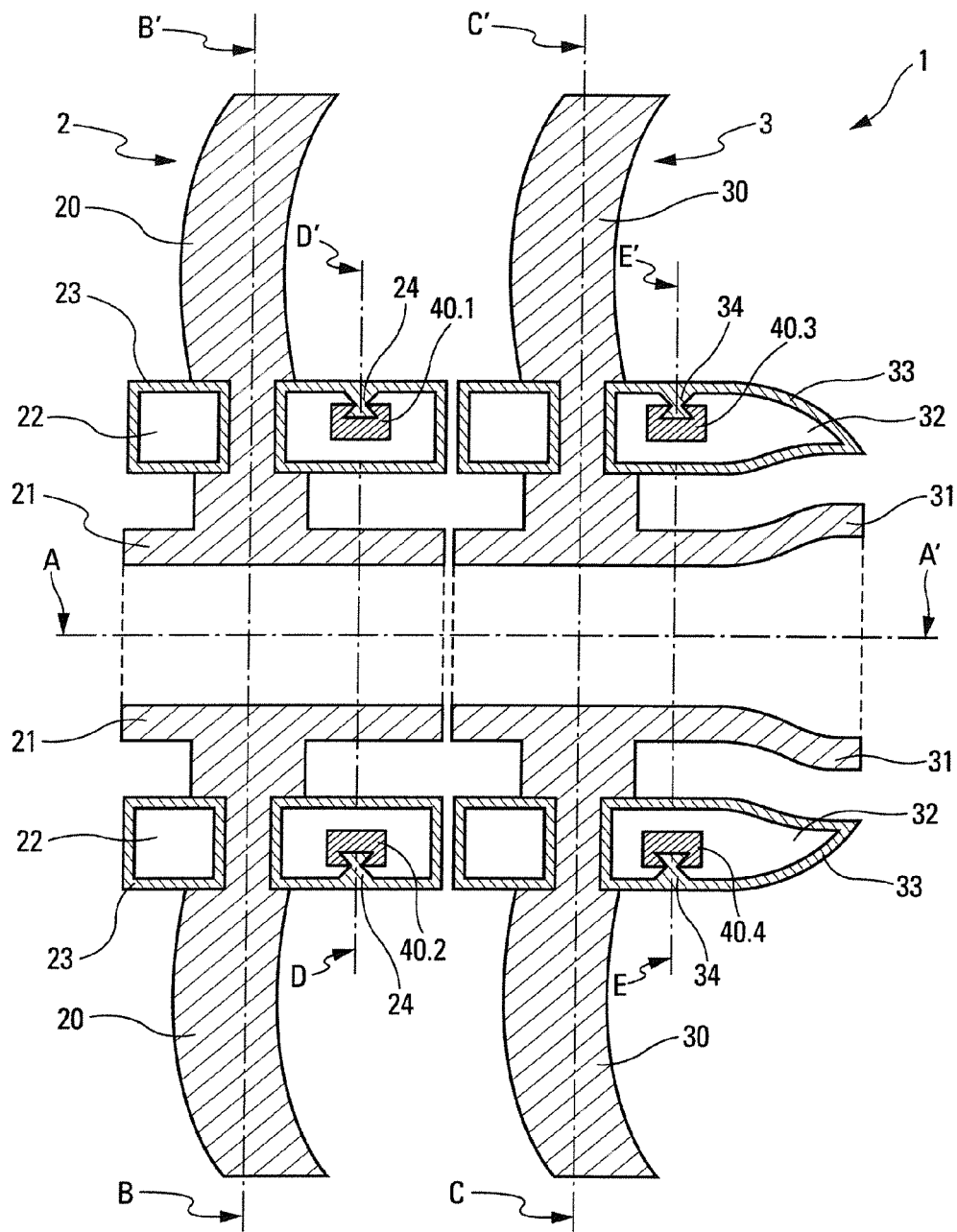
FIG. 1 is a schematic, partial section view of a propulsive system with coaxial non streamlined contra-rotating propellers, provided with a set of mobile counterweights according to the present invention.

The propulsive system 1, represented on FIG. 1, comprises two non streamlined propellers, respectively a front propeller 2 and a rear propeller 3, being arranged to rotate around a common axis A-A' in opposed rotation directions. The front propeller 2 comprises a plurality of blades 20 (only two of which are represented on FIG. 1), arranged in a plan B-B' (orthogonal to the axis A-A') forming the plan of the propeller 2, as well as a hub 21 concentrically surrounded by a hub envelope 22. Similarly, the rear propeller 3 comprises a plurality of blades 30 (only two of which are represented on FIG. 1) arranged in a plan C-C' (orthogonal to the axis A-A') forming the plan of the propeller 3, as well as a hub 31 concentrically surrounded by a hub envelope 32. The hub envelopes 22 and 32 are hollow and provided, respectively, with external walls 23 and 33.

According to the present invention, in order to eliminate—or at least to reduce—a possible unbalance due to a shift of the centre of gravity of each propeller relative to the axis of rotation A-A', there are arranged in places provided on the hub envelopes 22 and 32, coaxially to said axis of rotation A-A', a set of counterweights 40.1, 40.2, 40.3 and 40.4, the respective masses (for example between 70 and 140 grams for a distance to the axis of rotation of the propellers of 700 mm) and angular positions of which are determined so as to correctly position said centres of gravity.

More precisely, the internal faces of the external walls 23 and 33 are provided with guiding slots, respectively, 24 and 34, being coaxial to said hub envelopes 22 and 32 and located in plans, respectively, D-D' and E-E', being orthogonal to the axis A-A'. Such guiding slots 24 and 34 are able to cooperate respectively with said counterweights 40.1, 40.2, 40.3 and 40.4, so arranged inside the hub envelopes 22 and 32 that said counterweights, movably mounted on said guiding slots, can be moved along the latter since to be correctly positioned, so as to balance the propulsive system 1 at any time.

Subsequently, only one mobile counterweight 40 (designating indifferently one of the counterweights 40.1 or 40.2) being able to move along the guiding slot 24, located in the plan D-D' of the front propeller 2, will be described, but it goes without saying that the following can similarly apply to mobile counterweights being able to move along other guiding slots, including the guiding slot 34.

Figure 2:
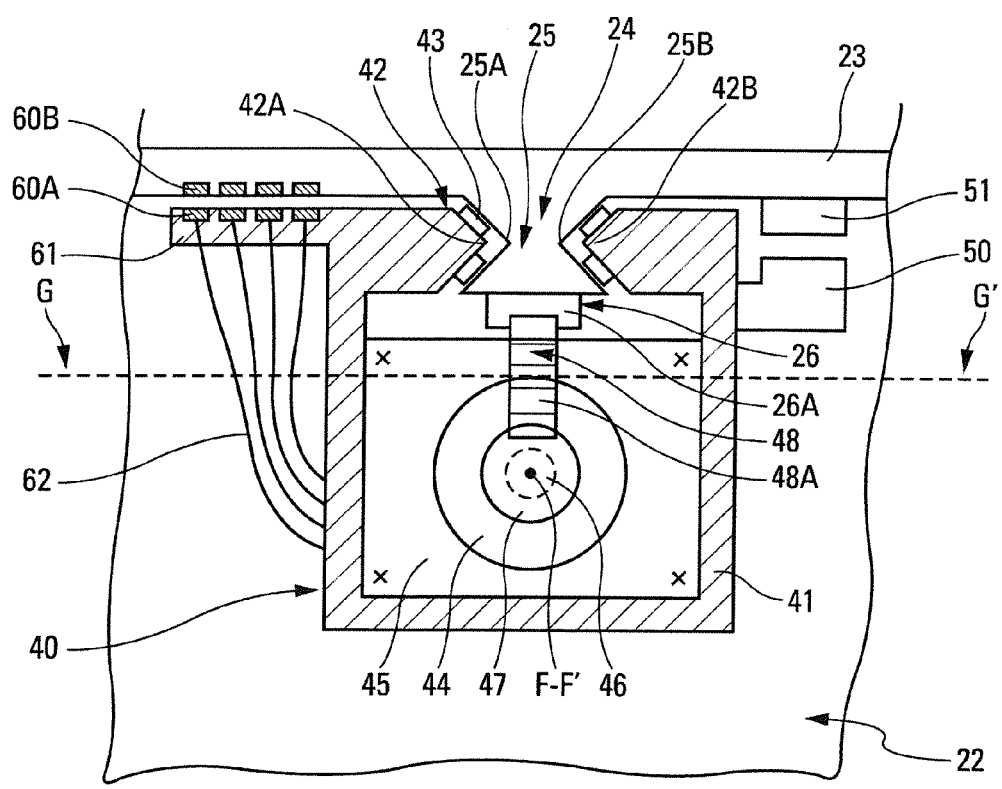
FIG. 2 is an axial section view of a counterweight being movably mounted on a guiding slot arranged on the corresponding hub envelope, in a plan passing thru said mobile counterweight.
Figure 3:
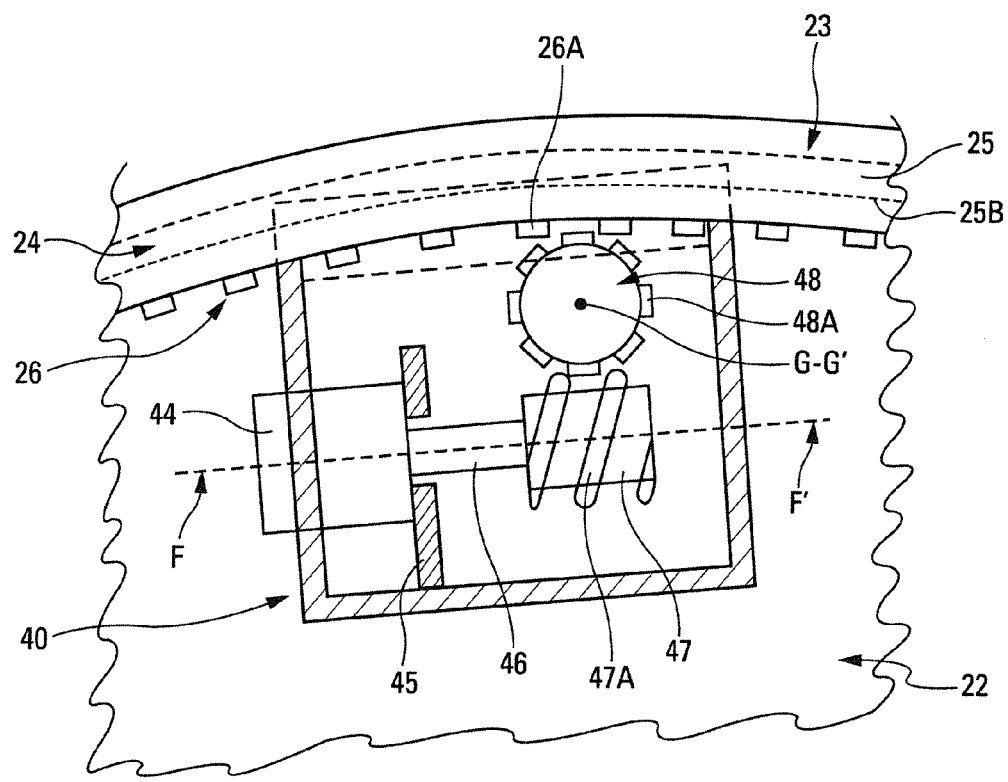
FIG. 3 is a cross-section view of the mobile counterweight of FIG. 2, in a plan passing thru the guiding slot.

The guiding slot 24, represented more in details on FIGS. 2 and 3, comprises a rib 25 arranged at the level of the internal face or the external wall 23. Such rib 25, projecting on the external wall 23 of the hub envelope 22, presents side recesses 25A and 25B respectively arranged on both sides of said rib 25, said recesses 25A and 25B being able to cooperate with holding means 42 provided on the mobile counterweight 40. More precisely, the counterweight 40 comprising a housing 41 enclosing the elements allowing for the displacement of the latter, the holding means 42 are arranged on the lower part of said housing 41, side depressions 42A and 42B being arranged in such lower part in a view to cooperate respectively with the side recesses 25A and 25B of the rib 25.

Thus, the mobile counterweight 40 may be integrally held with the rib 25 when the latter is moved along the guiding slot 24. Therefore, so as to favor an optimum cooperation between the side recesses 25A and 25B of the rib 25 and the side depressions 42A and 42B of the counterweight 40, it can be envisaged to arrange adjustment plots (or a ball recirculation guiding system) 43 on said side depressions 42A and 42B.

The guiding slot 24 includes moreover a rack 26 provided with a set of teeth 26A being equidistant and regularly distributed on the rib 25, projecting relative to said rib 25 (FIG. 3).

The mobile counterweight 40 comprises, inside its housing 41, an electrical engine 44 intended to control the displacement of said counterweight 40 according to the rotation direction of the latter. An additional wall 45 is made integral with both the housing 41 and the electrical engine 44, so that the latter are coupled with each other. The electrical engine 44 is furthermore integral with a driving shaft 46 being able to rotate around an axis F-F' and supporting an endless screw 47. Therefore, upon the operation of the electrical engine 44, the rotation of the latter is transmitted to the endless screw 47 thru the driving shaft 46. Furthermore, the endless screw 47 is provided with a set of helical grooves 47A forming in such a way a threading.

The mobile counterweight 40 further comprises a pinion (or gear) 48 able to rotate around an axis G-G', being orthogonal to the axis F-F', and provided with a set of equidistant teeth 48A. The pinion 48 is arranged, relative to the endless screw 47, so that said pinion 48 meshes with said endless screw 47. Thus, when the endless screw 47 rotates around the axis F-F' under the action of the electrical engine 44, the helical grooves 47A of said endless screw 47 mesh with the teeth 48A of the pinion 48 so as to convert the rotation of said endless screw 47 around the axis F-F' into a rotation of said pinion 48 around the axis G-G' being orthogonal to said axis F-F'.

The pinion 48 being able to rotate around the axis G-G' is furthermore arranged, relative to the guiding slot 24, so that said pinion 48 meshes with the rack 26 of said slot. Thus, when the pinion 48 rotates around the axis G-G' under the effect of the rotation of the endless screw 47 with which it meshes, the gears 48A of the latter mesh with the teeth 26A of the rack 26 so as to convert the rotation of said pinion 48 into a translation of the latter along said rack 26, thereby enabling to control the displacements of the mobile counterweight 40 along the guiding slot 24.

In such a way, the electrical engine 44 being controlled so as to rotate the driving shaft 46 in two opposed directions, the selection of such rotation direction governs the choice of the endless screw 47, as well as the one of the pinion 48, and thus the displacement direction of the pinion 48 and of the mobile counterweight 40.

It will be noticed that the pitch of the helical grooves 47A on the endless screw 47 is preferably small, and this to avoid that the external efforts from the rack 26 and thru the pinion 48 cannot drive in rotation the shaft 46 around the axis F-F'. The mobile counterweight 40 thus remains locked under the action of any external effort due for example to the propeller acceleration tangential efforts, and this even in the case of a default of the electrical engine 44.

Furthermore, the mobile counterweight 40 being mounted on the guiding slot 24, at the level of the external wall 23 of the hub envelope 22, but inside the latter, a hatch can be provided on said external wall 23, thru which said mobile counterweight 40 is accessible for the maintenance thereof.

Figure 4A:
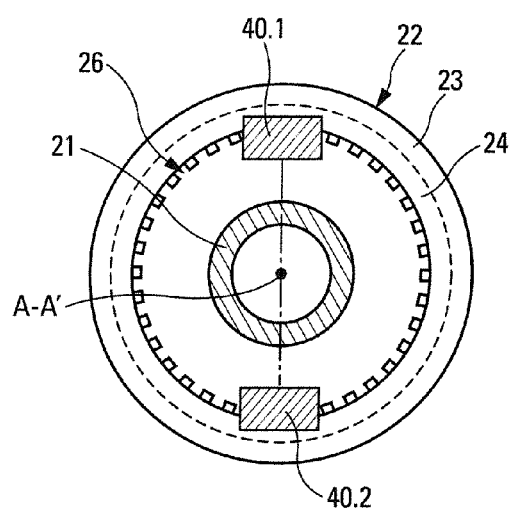
FIGS. 4A and 4B are respectively two cross-section views of a guiding slot receiving two mobile counterweights, in a plan passing thru said guiding slot, for two different relative positions of said mobile counterweights.
Figure 4B:
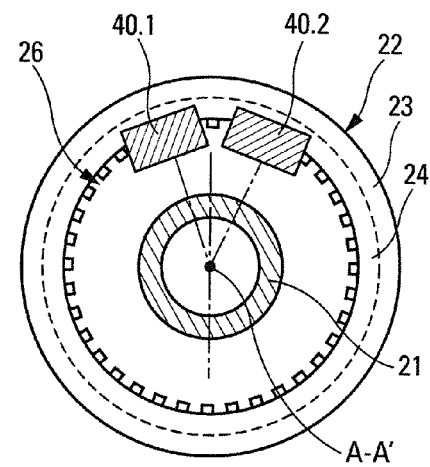

As shown on FIGS. 4A and 4B, the arrangement of a plurality of such mobile counterweights on a same guiding slot 24, for example two mobile counterweights 40.1 and 40.2 being similar to the mobile counterweight 40 above described referring to FIGS. 2 and 3, enables to punctually add masses so as to balance the front 2 and rear 3 propellers, and thus the propulsive system 1.

With this end in view, both mobile counterweights 40.1 and 40.2 can be moved on the guiding slot 24 so as to reach:
  an extreme position for which the counterweights are opposed to each other (FIG. 4A), which thus not generates any counterweight effect, or
  an extreme position for which the counterweights are adjacent to each other (FIG. 4B), which generates a maximum counterweight effect, or
  an intermediate position between such two extreme positions, which generates a counterweight effect as a function of the respective positions of the counterweights.

It will be noticed that it is possible to arrange on a same guiding slot, according to the present invention, a number of mobile counterweights higher than two, the counterweight effect so-produced by the latter depending then on their relative positions on said guiding slot.

So that the displacement of the mobile counterweight 40 along the guiding slot is controlled at each time as a function of an estimation of the possible unbalance, the propulsive system 1 is subjected to, the external wall 23 of the hub envelope 22 is provided with an angular graduation 51 and the mobile counterweight 40 comprises an angular graduation reader 50 being turned to the angular graduation 51 of said external wall 23. Thus, the angular position of the mobile counterweight 40 along the guiding slot 40 may be determined.

The guiding slot 24 and the mobile counterweight 40 further comprise electrical contacts 60A ad 60B (four of each on FIG. 2), being integral respectively with said mobile counterweight 40 and the external wall 23 of the hub envelope 22. The electrical contacts 60A are arranged at the level of a protuberance 61 located on the housing 41 of the mobile counterweight 40 and communicate with the electrical engine 44 thru electrical wires 62.

Figure 6:
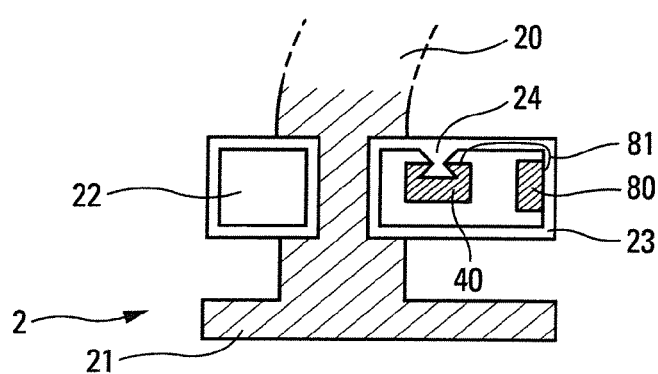
FIG. 6 is a schematic, partial section view of a hub envelope of FIG. 1 according to a particular embodiment of the invention.

The annular electrical contacts 60B are connected to an electrical source from, for example, a tapping on the electrical anti-icing system 80 of the corresponding propeller (represented on FIG. 6). The electrical power is then generated by the anti-icing system 80 of the front propeller 2, said anti-icing system 80 being therefor connected to said mobile counterweight 40 thru an electrical connection 81.

Figure 5:
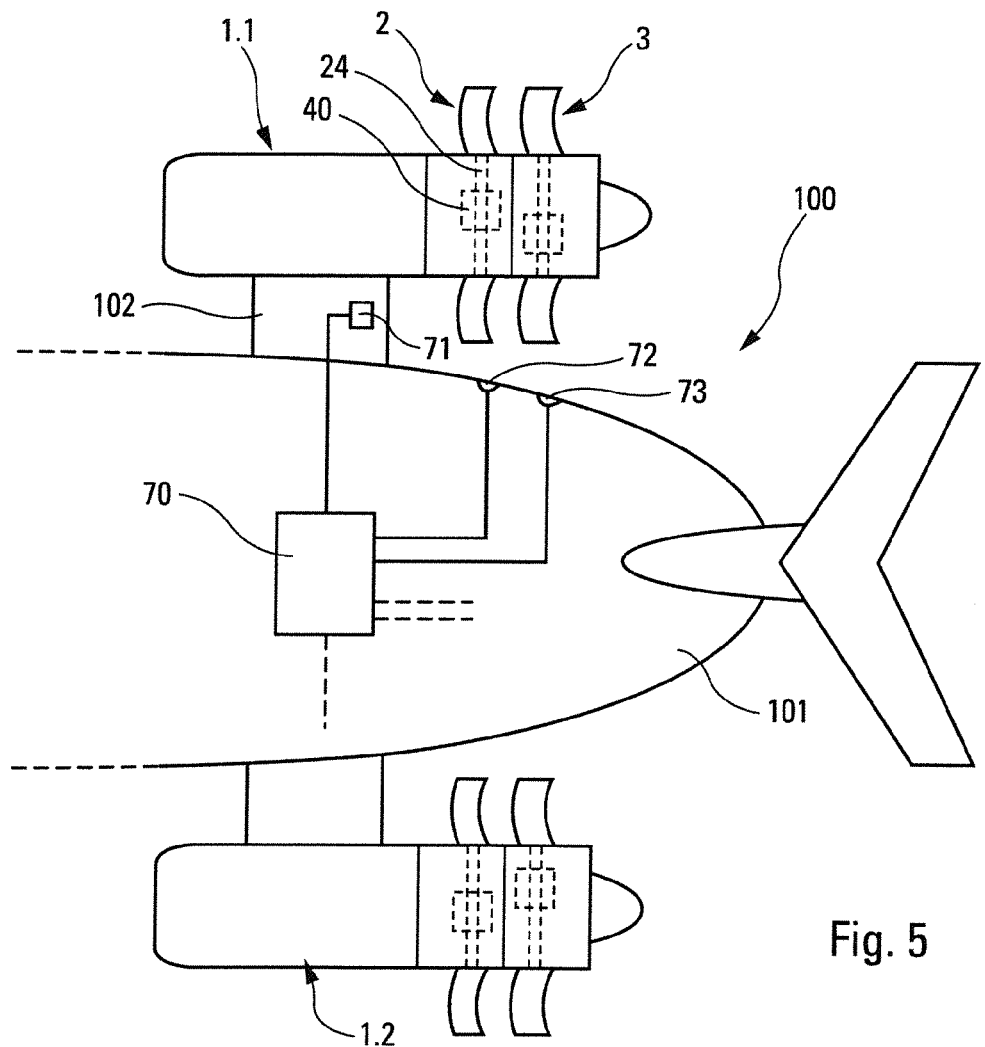
FIG. 5 is a schematic partial view of an aircraft equipped with at least one propulsive system such as the one represented on FIG. 1.

FIG. 5 illustrates an exemplary embodiment of the present invention for balancing an aircraft 100 equipped, on either part of its rear portion 101, with two propulsive systems 1.1 and 1.2 being similar to the propulsive system 1 above described referring to FIGS. 1 to 3.

In this example, the aircraft 100 is equipped, as far as the propulsive system 1.1 (but that could also apply to the propulsive system 1.2) is concerned, with an electronic controller 70 adapted to control measuring means for the possible unbalance of said propulsive system 1.1, more particularly:
  one accelerometer 71 adapted to collect information on the vibrations of the propellers 2 and 3, the latter being arranged on the connecting arm 102 (between the rear portion 101 and the propulsive system 1.1), in the direction of said propellers 2 and 3, and
  two optical sensors 72 and 73 so as to be able to determine the angular positions of each of the front 2 and rear 3 propellers.

Other measuring means allowing a possible angular deviation of the propellers 2 and 3 to be determined, can also be used in substitution (or in addition) to the accelerometer 71 and to the above mentioned optical sensors 72 and 73.

Thus, the electronic controller 70 is able to determine at each time the possible unbalance of the propulsive system 1.1 and to deduct therefrom the angular position of the mobile counterweights 40, for which such unbalance can be eliminated (or at least reduced). The electronic controller 70 can then transmit to the mobile counterweights 40 corresponding angular positioning orders, for example thru wireless signals. The so transmitted orders by the electronic controller 70 allow the operation of the electrical engine 44 (in one of the two above mentioned opposed directions) to be ordered while taking into account, on the one side, the angular position of the mobile counterweights 40 so as to eliminate (or at least to reduced) the possible unbalance, and, on the other side, the present angular positions of such counterweights transmitted by the angular position reader 50 equipping each mobile counterweight 40.

The present invention has been described above for a mobile counterweight 40, the rotation of the driving shaft 46 of which is driven by an electrical engine 44 supplied by a power tapping on the electrical anti-icing system 80 of the propeller. However, the electrical source can also be present under other forms such as an electrical battery, the autonomy of which is at least equal to the operating life of the propulsive system 1 for one flight cycle. Upon then, it is not necessary to use electrical contacts 60A and 60B (represented on FIG. 2).

It will be noticed that other electrical supplies could be also envisaged, for example:
- a power generator arranged between the front propeller 2 and the rear propeller 3 and using their relative displacement as a power source;
- an electromagnetic inductor; or
- a thermal gradient-to-electrical power converter, using the temperature differences between the airflow crossing the propulsive system 1 and the external air, which needs a specific electrical battery (which can be also installed inside the mobile counterweight 40).

The present invention has been also described above for one guiding slot for each propeller, but it goes without saying that several guiding slots could be arranged on a same propeller. In particular, two guiding slots could be arranged on one propeller, respectively on the front end and on the rear end of the corresponding hub envelope, thereby enabling to compensate both the forces and the aerodynamic moments which could be exerted on the propellers when the propulsive system 1 is in flight conditions.

The invention claimed is:

1. A balancing method for a propulsive system with at least two coaxial non streamlined contra-rotating propellers, each of said propellers comprising a hub concentrically surrounded by a hub envelope and each of said hub envelopes being provided with an external wall, said balancing method according to which, to eliminate, or at least to reduce a possible unbalance of said propulsive system, counterweights are arranged on places provided on the latter,
    wherein at least one of said counterweights is movably mounted on a guiding slot being coaxial to the corresponding hub envelope, the displacement of said mobile counterweight along said guiding slot being controlled as a function of an estimation of the possible unbalance of said propulsive system.

2. The method according to claim 1,
    wherein said guiding slot comprises a rib provided on the external wall of the corresponding hub envelope.

3. The method according to claim 1,
    wherein said guiding slot presents side recesses and said mobile counterweight comprises means for holding the latter inside said side recesses.

4. The method according to claim 1,
    wherein said guiding slot is provided with a rack and said mobile counterweight comprises a pinion able to be meshed with said rack so that, thru said rack, the rotation of said pinion causes the displacement of said mobile counterweight along said guiding slot.

5. The method according to claim 4,
    wherein said mobile counterweight comprises an endless screw supported by a driving shaft and able to be meshed with said pinion, so that, thru the endless screw, the rotation of said driving shaft causes the rotation of said pinion.

6. The method according to claim 5
    wherein the endless screw is driven by an electrical engine.

7. The method according to claim 5,
    wherein the endless screw is driven by an electrical source being able to tap a part of the electric power generated by the anti-icing system of the corresponding propeller.

8. The method according to claim 1,
    wherein the displacement of said mobile counterweight along said guiding slot is controlled by control means being able to receive information on the possible unbalance of said propulsive system, to determine the position of each mobile counterweight so as to eliminate, or at least to reduce, said possible unbalance and to transmit to each mobile counterweight the corresponding displacement order.

9. The method according to claim 1,
    wherein, on the one side, the external wall of said hub envelope is provided of an angular graduation, and, on the other side, said mobile counterweight includes a reader for said angular graduation.

10. The method according to claim 1,
    wherein two of said counterweights are movably mounted on a guiding slot being coaxial to the corresponding hub envelope, the respective displacements of said mobile counterweights along said guiding slot being controlled as a function of an estimation of the possible unbalanced in said propulsive system.

11. A propulsive system with at least two coaxial non streamlined contra-rotating propellers, each of said propellers comprising a hub concentrically surrounded by a hub envelope and each of said hub envelopes being provided with an external wall, said propulsive system comprising counterweights arranged in places provided on the latter so as to eliminate, or at least to reduce, a possible unbalance of said propulsive system,
    wherein at least one of said counterweights is movably mounted on a guiding slot being coaxial to the corresponding hub envelope, the displacement of said mobile counterweight along said guiding slot being controlled as a function of an estimation of the possible unbalance in said propulsive system.

* * * * *